United States Patent [19]

Bühler

[11] Patent Number: 5,922,089
[45] Date of Patent: Jul. 13, 1999

[54] METHOD OF DYEING POLYESTER AND POLYESTER-CONTAINING TEXTILE MATERIALS

[75] Inventor: Ulrich Bühler, Alzensu, Germany

[73] Assignee: Dystar Japan Ltd., Osaka, Japan

[21] Appl. No.: 08/894,647

[22] PCT Filed: Feb. 27, 1995

[86] PCT No.: PCT/EP95/00702

§ 371 Date: Dec. 18, 1997

§ 102(e) Date: Dec. 18, 1997

[87] PCT Pub. No.: WO96/26982

PCT Pub. Date: Sep. 6, 1996

[51] Int. Cl.$^6$ ................... D06P 3/54; D06P 3/82
[52] U.S. Cl. ............. 8/639; 8/662; 8/922; 8/933
[58] Field of Search ................ 8/662, 922, 639, 8/933, 934

[56] References Cited

U.S. PATENT DOCUMENTS

| | | | |
|---|---|---|---|
| 4,452,609 | 6/1984 | Hamprecht | 8/694 |
| 4,968,318 | 11/1990 | Wregner et al. | 8/639 |
| 5,013,133 | 5/1991 | Himeno et al. | 8/531 |
| 5,279,621 | 1/1994 | Buhler | 8/475 |

FOREIGN PATENT DOCUMENTS

| | | |
|---|---|---|
| 2383924 | 10/1978 | France . |
| 2711130 | 9/1978 | Germany . |
| 3938631 | 5/1990 | Germany . |

*Primary Examiner*—Margaret Einsmann

[57] ABSTRACT

A process for dyeing a polyester or polyester-containing textile material at pH 8 to pH 11, which is characterized by applying one or more monoazo dyes of the formula I

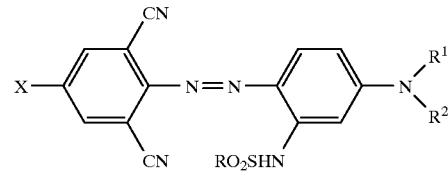

(I)

in which
X is $(C_1$–$C_3)$-alkyl,
R is $(C_1$–$C_6)$-alkyl and
$R^1$ and $R^2$, independently of one another, are linear $(C_2$–$C_4)$-alkyl, $R^1$ and $R^2$, independently of one another, being $(C_3$–$C_4)$-alkyl if R is methyl.

11 Claims, No Drawings

METHOD OF DYEING POLYESTER AND POLYESTER-CONTAINING TEXTILE MATERIALS

The present invention relates to a process for dyeing textile polyester and polyester-containing textile materials with red dicyanoazo dyes.

In general, textile polyester or polyester-containing textile materials are dyed with disperse dyes from an aqueous dyeing bath at HT conditions in a temperature range of from 120 to 140° C. and at pH values of from 4 to 6. This is due to the fact that disperse dyes are partly or completely destroyed at higher pH values. Accordingly, dyeing at higher pH values results in losses in color strength and shifts in hue, as a result of which the dyeings are not reproducible. Usually, the polyester fiber is subjected in a separate step, prior to dyeing, to an alkaline rinsing treatment in order to remove auxiliaries used during weaving or spinning of the fiber. Examples of these auxiliaries are oiling and sizing agents which when present would make it difficult or impossible to achieve level dyeing of the polyester fiber. The alkaline treatment is also carried out in order to destroy oligomers of the polyester fiber which during the dyeing process have migrated from the interior of the fiber and give the dyeing an unlevel appearance and in order to retain them in the aqueous dyeing liquor. The oligomers mentioned are undesirable especially in yarn dyeing because during spinning of the dyed yarns in the spinning apparatus they become deposited in the form of powders as a result of abrasion in those places where the yarn is deflected. They thus soil the apparatus and cause the yarn to tear.

This alkaline rinsing treatment is advantageously carried out at elevated temperature. To save time and energy and to reduce the number of apparatuses required for the two processes, alkaline pre-treatment and dyeing, the goal has always been to combine the two processes to one single-bath rinsing and dyeing process. However, in order to achieve this goal, it is necessary to develop processes producing reproducible dyeings in an aqueous dyeing bath at pH 8 to pH 11.

Polyester/cellulose or polyester/polyamide blend fabrics are usually dyed with disperse or reactive dyes in two dyeing steps from an aqueous dyeing bath. As mentioned above, the disperse dyes are applied to the polyester portion at pH 4 to pH 6 and the reactive dyes to the cellulose or polyamide portion in the pH range between 11 and 13. Here, too, the goal in the past has been to develop a single-bath application process for both classes of dyes. For this single-bath application process, it was necessary to find reactive dyes which can be dyed at pH values of as low as 8 to 11, and this method also required processes which ensure that the polyester portion can be reproducibly dyed with disperse dyes under these conditions.

To overcome the deficiencies of the previous processes, DE-A 3,938,631 describes a method in which dyeing with disperse dyes takes place in the pH range between 8 and 10 in the presence of at least one amino acid which, if desired, may substituted on the nitrogen atom and/or an alkali metal salt of an amino acid which, if desired, may be substituted on the nitrogen atom.

Thus, for example, this method allows brilliant red dyeings in the shade of the anthraquinonoid dye C.I. Disperse Red 60 at pH 9.5 (Use Example 33 of DE-A 3,938,631 or its equivalent U.S. Pat. No. 5,019,133) to be obtained using the dye of the formula

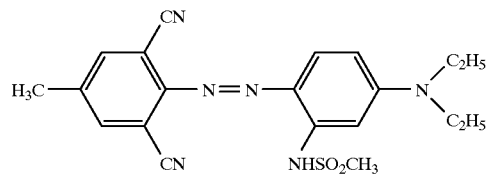

However, the alkali resistance of this dye is not sufficient for dyeings at higher pH values or for carrying out the abovementioned rinsing treatment in an efficient manner. The same is also true of the commercially available mixture of the dyes of the formula

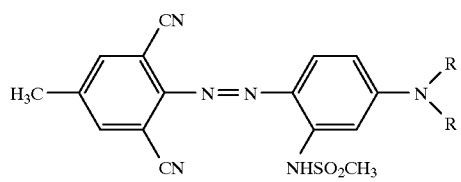

$R = C_2H_5, n-C_3H_7$ which, at higher pH values, exhibits losses in color strength and shifts in hue. This is probably due to the acidity of the sulfonamide hydrogen, such as described, for example, in R.O.C. Norman "Principles of Organic Synthesis", Methnen and Co. Ltd. and Science Paperbacks, 1968, on page 66. According to this reference, when dyeing at higher pH values, the acidity mentioned results in at least partial dye salt formation.

EP-A 501,238 or its equivalent U.S. Pat. No. 5,279,621 already discloses red dicyanoazo dyes which can be used to dye polyester or polyester-containing fiber materials by the HT method in the pH range between 8 and 11. Although these dyes exhibit high pH stability, they do not possess the desired brilliance. Moreover, their shade does not come close enough to that of C.I. Disperse Red 60, and they also show deficiencies in terms of application and wear fastness properties.

Accordingly, the object of the present invention is to provide alkali-resistant dyes which produce brilliant red dyeings having sufficently high wear fastness properties.

Surprisingly, it has now been found that selected dicyanoazo dyes achieve this object. These dicyanoazo dyes have already been disclosed in part in DE-A 2,711,130 which is equivalent to U.S. Pat. No. 4,452,609, but their specific suitability for dyeing in the presence of alkali has not been disclosed or been obvious.

Accordingly, the invention relates to a process for dyeing polyester or polyester-containing textile materials at pH 8 to pH 11, which comprises using one or more monoazo dyes of the formula I

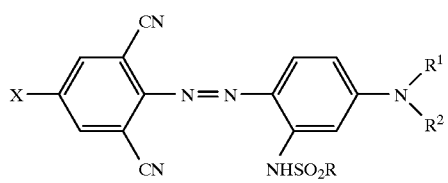

(I)

in which

X is $(C_1-C_3)$-alkyl,

R is $(C_1-C_6)$-alkyl and $R^1$ and $R^2$, independently of one another, are linear $(C_2-C_4)$-alkyl, $R^1$ and $R^2$, independently of one another, being $(C_3-C_4)$-alkyl if R is methyl.

If X is $(C_1-C_3)$-alkyl, it is, for example, methyl, ethyl, i-propyl or n-propyl, ethyl being preferred and methyl being particularly preferred.

If R is $(C_1-C_6)$-alkyl, it is, for example, methyl, ethyl, n-propyl, i-propyl, n-butyl, i-butyl, sec-butyl, n-pentyl, i-pentyl and n-hexyl.

Preferably, R is $(C_3-C_5)$-alkyl.

If $R^1$ und $R^2$ are linear $(C_2-C_4)$-alkyl, they are, for example, ethyl, n-propyl and n-butyl.

Preferably, $R^1$ and $R^2$ are identical and are ethyl or n-propyl.

Preferred dyes of the formula I to be used according to the invention are those in which the sum of the carbon atoms in the radicals X, R, $R^1$ and $R^2$ is 8 to 14, particularly preferably 9 to 12.

Particularly preferred dyes of the formula I exhibit a plurality of the abovementioned preferred features.

The present invention also provides monoazo dyes of the formula I

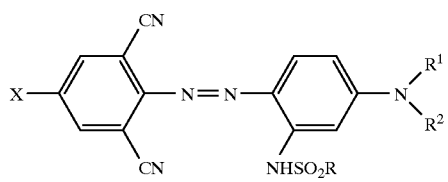

(I)

in which

X is $(C_1-C_3)$-alkyl,

R is $(C_5-C_6)$-alkyl and $R^1$ and $R^2$, independently of one another, are linear $(C_2-C_4)$-alkyl.

Preferred dyes of the formula I according to the invention are those which exhibit the features described above as preferred.

The dyes of the formula I can be prepared by the methods known to one skilled in the art for preparing dicyanoazo dyes. In particular, they can be prepared by cyano exchange from compounds of the formula II

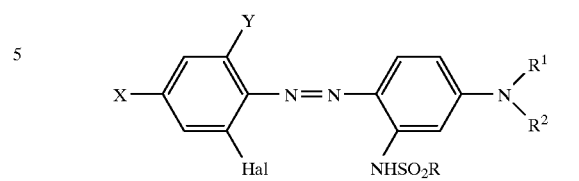

(II)

in which

Y is cyano or hal, hal is a halogen atom, such as chlorine or, in particular, bromine, and X, R, $R^1$ and $R^2$ are as defined above.

The cyano exchange process is described, for example, in DE-A 2,711,130. Preparation of the compounds of the formula II can also take place by the procedure described there.

The process according to the invention can be carried out using a dye of the formula I. However, it is also possible to carry it out using two, three or four dyes of the formula I, preference being, however, given to two and three dyes. In these cases, the proportion of a dye is preferably 5 to 95% by weight, particularly preferably 20 to 70% by weight, in each case relative to the total amount of dye.

If a plurality of dyes of the formula I are used, they preferably differ only in the meaning of the radicals R or only in the meaning of the radicals $R^1$ and $R^2$, which are identical within a dye.

The process according to the invention is preferably carried out under HT conditions, i.e. in an aqueous dyeing liquor at temperatures of between 120° C. and 140° C. in a dyeing autoclave. The pH is preferably 9 to 10.

The dyes of the formula I according to the invention can be applied to the fiber either by the process according to the invention or by other customary methods of dyeing and printing synthetic hydrophobic textile materials, for example under HT conditions in the pH range between 4 and 11, by the so-called thermosol method or else by a printing method.

The polyesters to be dyed by the process according to the invention are in particular those based on poly(ethylene glycol) terephthalates. Examples of polyester-containing textile materials are polyester/polyamide blends.

In the process according to the invention, the dyes or dye mixtures are used in finely divided form. Fine dispersion of the dyes is carried out in a manner known per se by slurrying the dye formed during manufacture together with dispersants in a liquid medium, preferably in water, and subjecting the mixture to shear forces, as a result of which the dye particles orginally present are mechanically comminuted to such an extent that an optimum specific surface area is achieved and sedimentation of the dye is minimized. The particle sizes of the dyes are in general between 0.5 and 5 µm, preferably about 1 µm.

The dispersants used in the milling process can be nonionic or anionic. Examples of nonionic dispersants are reaction products of alkylene oxides, such as, for example, ethylene oxide or propylene oxide, with alkylatable compounds, such as, for example, fatty alcohols, fatty amines, fatty acids, phenols, alkylphenols and carboxamides. Examples of anionic dispersants are lignosulfonates, alkyl sulfonates or alkylaryl sulfonates or alkylaryl polyglycol ether sulfonates.

The dye preparations thus obtained should be pourable for most methods of application. Accordingly, the dye and dispersant contents are limited in these cases. In general, the dispersions are brought to a dye content of up to 25% by weight and to a dispersant content of up to about 25% by weight. For economic reasons, dye contents are in most cases not allowed to fall below 15% by weight.

The dispersions can also contain further auxiliaries, for example those acting as oxidizing agents, such as, for example, sodium m-nitrobenzenesulfonate, or fungicides, such as, for example, sodium o-phenylphenolate.

For certain areas of application, powder formulations are preferred. These powders contain the dye or the dye mixture, dispersants and other auxiliaries, such as, for example, wetting agents, oxidizing agents, preservatives and dust-proofing agents.

A preferred process for preparing pulverulent dye preparations consists in removing the liquid from the liquid dye dispersions described above, for example by vacuum drying, freeze drying, by drying on drum driers, but preferably by spray drying.

The dyeing liquors are prepared by diluting the required amounts of the dye formulations prepared in accordance with the details given above with the dyeing medium, preferably with water, such that a liquor ratio of 5:1 to 50:1 is obtained for dyeing. Additionally, further dyeing assistants, such as dispersants, wetting agents and fixation aids are in general added to the liquors.

The required pH of the dyeing liquor is adjusted before or during dyeing by adding bases such as alkali metal hydroxides, for example aqueous sodium hydroxide solution, alkali metal bicarbonates, for example sodium bicarbonate, or alkali metal carbonates, for example sodium carbonate.

To minimize pH variations, it is preferred to add buffer substances, such as described, for example, in JSDC 77 (1979), p. 47 or JSD 79 (1981), p. 115. Particularly suitable buffer substances are those having the highest buffering effect in the pH range between 9 and 11. Examples of suitable buffer systems are acetic acid/sodium pyrophosphate, boric acid/borax, sodium dihydrogen phosphate/disodium hydrogen phosphate, phosphoric acid/succinic acid/boric acid or combinations of organic phosphorus compounds with polycarboxylic acids. The amounts used of the buffer system are preferably between 0.5 and 10 g/l.

The amino acids described in DE-A 3,938,631 can also be used as buffer systems in the manner described there.

EXAMPLE 1

0.5 g of a 20% powder preparation of the dye of the formula Ib

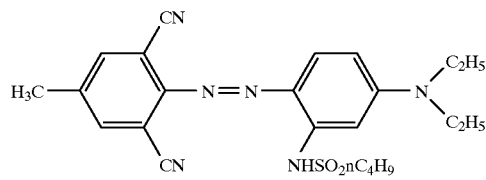

(Ib)

is used to dye 100 g of a poly(ethylene terephthalate) fabric at 130° C. for 45 minutes in a dyeing autoclave from a dyeing liquor comprising 2 l of water, 2 g of a dyeing assistant based on a formaldehyde condensation product and 5 g of a buffer substance which is a mixture of an organic phosphorus compound and a polycarboxylic acid, after the pH of the dyeing liquor had previously been brought to 10 with aqueous sodium hydroxide solution. The dyeing is then rinsed, reduction cleared, rinsed again and dried to give a red dyeing having a brilliant shade.

Comparative experiment 1:

Dyeing is repeated, except that now 4 g of sodium acetate are added as the buffer substance and the pH of the dyeing liquor is brought to 4.5 with acetic acid. The dyeing obtained is almost identical in color strength and shade, and virtually no decomposition of the dye has taken place at pH 10.

Comparative experiment 2:

The dyeings at pH 10 and pH 4.5 described above are repeated, except that the dye of the formula Ib is replaced by the commercial dye of the formula III.

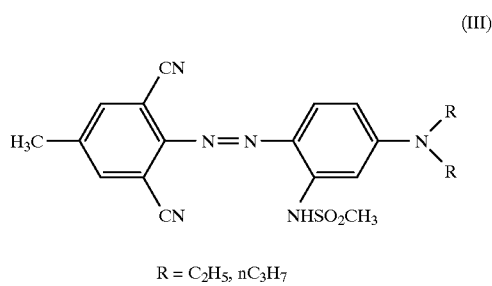

(III)

R = $C_2H_5$, $nC_3H_7$

The dyeing obtained at pH 10 exhibits a color depth which is only about 45% of the color depth obtained at pH 4.5.

EXAMPLE 2

57.4 g of the precursor of the formula IV

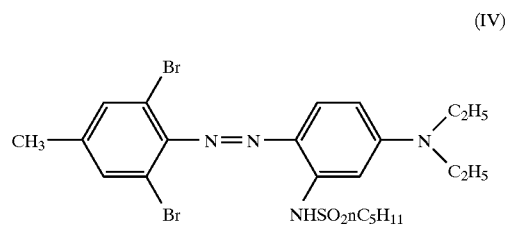

(IV)

are suspended in 250 ml of dimethylformamide, and 11.8 g of zinc cyanide and 1 g of copper(I) cyanide are added to the resulting suspension. After heating at 100° C. for 30 minutes, the dye is precipitated with 250 ml of water, filtered off with suction, washed with 50% aqueous dimethylformamide and then with water and dried at 50° C. It is soluble in acetone to give a bluish red solution, has its absorption maximum in phthalic ester at 524 nm and dyes polyester in a clear bluish-red shade even at pH values >9. Accordingly, the shade is very close to that of C.I. Disperse Red 60.

The table below lists further dyes which can be used in accordance with the process according to the invention. They dye polyester in clear bluish-red shades which are similar to the shade of C.I. Disperse Red 60.

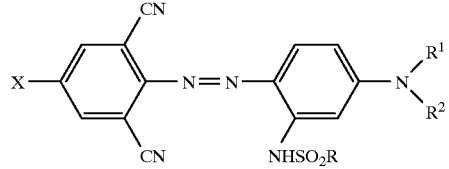

| X | R | R¹ | R² |
|---|---|----|----|
| $CH_3$ | $n-C_3H_7$ | $C_2H_5$ | $C_2H_5$ |
| $CH_3$ | $i-C_3H_7$ | $C_2H_5$ | $C_2H_5$ |
| $CH_3$ | $i-C_4H_9$ | $C_2H_5$ | $C_2H_5$ |
| $CH_3$ | $sec-C_4H_9$ | $C_2H_5$ | $C_2H_5$ |
| $CH_3$ | $n-C_5H_{11}$ | $C_2H_5$ | $C_2H_5$ |
| $CH_3$ | $i-C_5H_{11}$ | $C_2H_5$ | $C_2H_5$ |
| $CH_3$ | $n-C_6H_{13}$ | $C_2H_5$ | $C_2H_5$ |
| $CH_3$ | $C_2H_5$ | $n-C_3H_7$ | $n-C_3H_7$ |
| $CH_3$ | $C_2H_5$ | $n-C_4H_9$ | $n-C_4H_9$ |
| $CH_3$ | $C_2H_5$ | $n-C_3H_7$ | $n-C_4H_9$ |
| $CH_3$ | $n-C_3H_7$ | $C_2H_5$ | $n-C_4H_9$ |
| $CH_3$ | $n-C_3H_7$ | $n-C_3H_7$ | $n-C_3H_7$ |
| $CH_3$ | $n-C_3H_7$ | $n-C_3H_7$ | $n-C_4H_9$ |
| $CH_3$ | $i-C_3H_7$ | $n-C_3H_7$ | $n-C_3H_7$ |
| $CH_3$ | $i-C_3H_7$ | $n-C_4H_9$ | $n-C_4H_9$ |
| $CH_3$ | $n-C_4H_9$ | $C_2H_5$ | $n-C_3H_7$ |
| $CH_3$ | $n-C_4H_9$ | $n-C_3H_7$ | $n-C_3H_7$ |
| $CH_3$ | $n-C_4H_9$ | $n-C_4H_9$ | $n-C_4H_9$ |
| $CH_3$ | $n-C_4H_9$ | $C_2H_5$ | $n-C_3H_7$ |
| $CH_3$ | $i-C_4H_9$ | $n-C_3H_7$ | $n-C_3H_7$ |
| $CH_3$ | $i-C_4H_9$ | $n-C_4H_9$ | $n-C_4H_9$ |
| $CH_3$ | $sec-C_4H_9$ | $n-C_3H_7$ | $n-C_3H_7$ |
| $CH_3$ | $n-C_5H_{11}$ | $n-C_3H_7$ | $n-C_3H_7$ |
| $CH_3$ | $n-C_5H_{11}$ | $n-C_3H_7$ | $n-C_4H_9$ |
| $CH_3$ | $n-C_6H_{13}$ | $n-C_3H_7$ | $n-C_3H_7$ |
| $CH_3$ | $(CH_2)_2CH(CH_3)_2$ | $C_2H_5$ | $C_2H_5$ |
| $CH_3$ | $(CH_2)_2CH(CH_3)_2$ | $C_2H_5$ | $n-C_3H_7$ |
| $CH_3$ | $(CH_2)_2CH(CH_3)_2$ | $n-C_4H_9$ | $n-C_4H_9$ |
| $C_2H_5$ | $C_2H_5$ | $C_2H_5$ | $C_2H_5$ |
| $C_2H_5$ | $C_2H_5$ | $i-C_3H_7$ | $n-C_3H_7$ |
| $C_2H_5$ | $C_2H_5$ | $n-C_4H_9$ | $n-C^4H^9$ |
| $C_2H_5$ | $n-C_3H_7$ | $C_2H_5$ | $C_2H_5$ |
| $C_2H_5$ | $n-C_3H_7$ | $n-C_3H_7$ | $n-C_3H_7$ |
| $C_2H_5$ | $i-C_3H_7$ | $C_2H_5$ | $C_2H_5$ |
| $C_2H_5$ | $i-C_3H_7$ | $C_2H_5$ | $n-C_3H_7$ |
| $C_2H_5$ | $i-C_3H_7$ | $n-C_4H_9$ | $n-C_4H_9$ |
| $n-C_3H_7$ | $n-C_3H_7$ | $n-C_3H_7$ | $n-C_3H_7$ |
| $n-C_3H_7$ | $n-C_4H_9$ | $C_2H_5$ | $n-C_4H_9$ |
| $i-C_3H_7$ | $C_2H_5$ | $C_2H_5$ | $C_2H_5$ |
| $i-C_3H_7$ | $C_2H_5$ | $n-C_3H_7$ | $n-C_3H_7$ |
| $i-C_3H_7$ | $C_2H_5$ | $n-C_4H_9$ | $n-C_4H_9$ |
| $i-C_3H_7$ | $n-C_3H_7$ | $C_2H_5$ | $C_2H_5$ |
| $i-C_3H_7$ | $n-C_4H_9$ | $C_2H_5$ | $C_2H_5$ |
| $i-C_3H_7$ | $n-C_4H_9$ | $n-C_3H_7$ | $n-C_3H_7$ |
| $CH_3$ | $CH_3$ | $n-C_3H_7$ | $n-C_3H_7$ |
| $CH_3$ | $CH_3$ | $n-C_4H_9$ | $n-C_4H_9$ |
| $C_2H_5$ | $CH_3$ | $n-C_3H_7$ | $n-C_3H_7$ |

| X | R | R¹ | R² | Mixing ratio |
|---|---|----|----|----|
| $CH_3$ | $C_2H_5$ | $C_2H_5$ | $C_2H_5$ | 50 |
| $CH_3$ | $n-C_4H_9$ | $C_2H_5$ | $C_2H_5$ | 50 |
| $CH_3$ | $C_2H_5$ | $C_2H_5$ | $C_2H_5$ | 35 |
| $CH_3$ | $n-C_4H_9$ | $n-C_3H_7$ | $n-C_3H_7$ | 65 |
| $CH_3$ | $C_2H_5$ | $n-C_3H_7$ | $n-C_3H_7$ | 45 |
| $CH_3$ | $n-C_4H_9$ | $C_2H_5$ | $C_2H_5$ | 55 |
| $CH_3$ | $C_2H_5$ | $n-C_4H_9$ | $n-C_4H_9$ | 30 |
| $CH_3$ | $n-C_4H_9$ | $n-C_4H_9$ | $n-C_4H_9$ | 70 |
| $CH_3$ | $C_2H_5$ | $n-C_3H_7$ | $C_2H_5$ | 85 |
| $CH_3$ | $n-C_6H_{13}$ | $n-C_3H_7$ | $n-C_3H_7$ | 15 |
| $CH_3$ | $i-C_3H_7$ | $n-C_4H_9$ | $n-C_3H_7$ | 65 |
| $CH_3$ | $n-C_4H_9$ | $C_2H_5$ | $C_2H_5$ | 35 |
| $CH_3$ | $i-C_3H_7$ | $C_2H_5$ | $C_2H_5$ | 40 |
| $CH_3$ | $n-C_4H_9$ | $n-C_3H_7$ | $n-C_3H_7$ | 60 |
| $CH_3$ | $i-C_3H_7$ | $n-C_4H_9$ | $n-C_4H_9$ | 50 |
| $CH_3$ | $C_2H_5$ | $n-C_4H_9$ | $n-C_4H_9$ | 50 |
| $CH_3$ | $i-C_3H7$ | $C_2H_5$ | $C_2H_5$ | 55 |
| $CH_3$ | $i-C_4H_9$ | $C_2H_5$ | $C_2H_5$ | 45 |
| $CH_3$ | $i-C_3H7$ | $n-C_4H_9$ | $n-C_4H_9$ | 60 |
| $CH_3$ | $n-C_5H_{11}$ | $C_2H_5$ | $C_2H_5$ | 40 |
| $CH_3$ | $C_2H_5$ | $n-C_3H_7$ | $n-C_3H_7$ | 35 |
| $CH_3$ | $C_2H_5$ | $n-C_4H_9$ | $n-C_4H_9$ | 65 |
| $CH_3$ | $i-C_3H7$ | $n-C_3H_7$ | $n-C_3H_7$ | 50 |
| $CH_3$ | $i-C_3H7$ | $C_2H_5$ | $n-C_4H_9$ | 50 |
| $CH_3$ | $i-C_3H7$ | $C_2H_5$ | $C_2H_5$ | 65 |
| $CH_3$ | $i-C_3H7$ | $n-C_4H_9$ | $n-C_4H_9$ | 35 |
| $CH_3$ | $n-C_4H_9$ | $C_2H_5$ | $C_2H_5$ | 45 |
| $CH_3$ | $n-C_4H_9$ | $n-C_3H_7$ | $n-C_3H_7$ | 55 |
| $CH_3$ | $n-C_6H_{13}$ | $C_2H_5$ | $C_2H_5$ | 70 |
| $CH_3$ | $n-C_6H_{13}$ | $n-C_3H_7$ | $n-C_3H_7$ | 30 |
| $C_2H_5$ | $C_2H_5$ | $n-C_3H_7$ | $n-C_3H_7$ | 50 |
| $C_2H_5$ | $n-C_4H_9$ | $C_2H_5$ | $C_2H_5$ | 50 |
| $C_2H_5$ | $i-C_3H_7$ | $n-C_3H_7$ | $n-C_3H_7$ | 35 |
| $C_2H_5$ | $n-C_4H_9$ | $n-C_3H_7$ | $n-C_3H_7$ | 65 |
| $C_2H_5$ | $n-C_4H_9$ | $C_2H_5$ | $C_2H_5$ | 50 |
| $C_2H_5$ | $n-C_6H_{13}$ | $C_2H_5$ | $n-C_3H_7$ | 50 |
| $C_2H_5$ | $n-C_4H_9$ | $n-C_4H_9$ | $n-C_4H_9$ | 95 |
| $C_2H_5$ | $sec-C_4H_9$ | $C_2H_5$ | $C_2H_5$ | 5 |
| $n-C_3H_7$ | $n-C_3H_7$ | $C_2H_5$ | $C_2H_5$ | 55 |
| $n-C_3H_7$ | $i-C_3H7$ | $C_2H_5$ | $C_2H_5$ | 45 |
| $i-C_3H_7$ | $C_2H_5$ | $n-C_3H_7$ | $n-C_3H_7$ | 30 |
| $i-C_3H_7$ | $n-C_4H_9$ | $C_2H_5$ | $C_2H_5$ | 70 |
| $i-C_3H_7$ | $n-C_4H_9$ | $n-C_3H_7$ | $n-C_3H_7$ | 40 |
| $i-C_3H_7$ | $n-C_4H_9$ | $n-C_4H_9$ | $n-C_4H_9$ | 60 |
| $CH_3$ | $n-C_4H_9$ | $n-C_3H_7$ | $n-C_3H_7$ | 60 |
| $C_2H_5$ | $n-C_4H_9$ | $n-C_3H_7$ | $n-C_3H_7$ | 40 |
| $CH_3$ | $n-C_4H_9$ | $C_2H_5$ | $C_2H_5$ | 85 |
| $C_2H_5$ | $i-C_3H_7$ | $C_2H_5$ | $C_2H_5$ | 15 |
| $CH_3$ | $n-C_4H_9$ | $n-C_4H_9$ | $n-C_4H_9$ | 50 |
| $C_2H_5$ | $C_2H_5$ | $n-C_3H_7$ | $n-C_3H_7$ | 50 |
| $CH_3$ | $n-C_4H_9$ | $n-C_3H_7$ | $n-C_3H_7$ | 70 |
| $i-C_3H_7$ | $n-C_4H_9$ | $n-C_4H_9$ | $n-C_4H_9$ | 30 |
| $CH_3$ | $C_2H_5$ | $n-C_3H_7$ | $n-C_3H_7$ | 20 |
| $CH_3$ | $n-C_4H_9$ | $n-C_3H_7$ | $n-C_3H_7$ | 40 |
| $CH_3$ | $n-C_4H_9$ | $n-C_4H_9$ | $n-C_4H_9$ | 40 |
| $CH_3$ | $n-C_3H_7$ | $n-C_3H_7$ | $n-C_3H_7$ | 25 |
| $CH_3$ | $i-C_3H_7$ | $n-C_3H_7$ | $n-C_3H_7$ | 25 |
| $CH_3$ | $n-C_4H_9$ | $C_2H_5$ | $C_2H_5$ | 50 |
| $CH_3$ | $n-C_4H_9$ | $n-C_3H_7$ | $n-C_3H_7$ | 70 |
| $CH_3$ | $C_2H_5$ | $n-C_3H_7$ | $n-C_3H_7$ | 15 |
| $C_2H_5$ | $C_2H_5$ | $n-C_3H_7$ | $n-C_3H_7$ | 15 |
| $CH_3$ | $i-C_3H_7$ | $n-C_3H_7$ | $n-C_3H_7$ | 33 |
| $CH_3$ | $i-C_3H_7$ | $C_2H_5$ | $C_2H_5$ | 33 |
| $C_2H_5$ | $n-C_4H_9$ | $n-C_4H_9$ | $n-C_4H_9$ | 33 |
| $CH_3$ | $CH_3$ | $n-C_3H_7$ | $n-C_3H_7$ | 60 |
| $CH_3$ | $CH_3$ | $n-C_4H_9$ | $n-C_4H_9$ | 40 |
| $CH_3$ | $CH_3$ | $n-C_3H_7$ | $n-C_3H_7$ | 10 |
| $CH_3$ | $n-C_3H_7$ | $C_2H_5$ | $C_2H_5$ | 90 |
| $CH_3$ | $CH_3$ | $n-C_3H_7$ | $n-C_3H_7$ | 80 |
| $C_2H_5$ | $CH_3$ | $n-C_3H_7$ | $n-C_3H_7$ | 20 |

The table below lists dyes according to the invention.

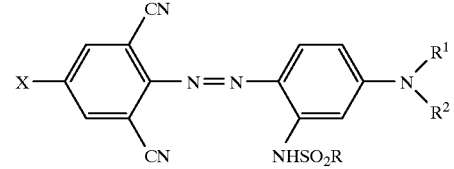

| X | R | R¹ | R² |
|---|---|----|----|
| $CH_3$ | $n-C_5H_{11}$ | $C_2H_5$ | $n-C_3H_7$ |
| $CH_3$ | $n-C_5H_{11}$ | $n-C_3H_7$ | $n-C_3H_7$ |
| $CH_3$ | $n-C_5H_{11}$ | $n-C_4H_9$ | $n-C_4H_9$ |
| $CH_3$ | $(CH_2)_2CH(CH_3)_2$ | $C_2H_5$ | $C_2H_5$ |
| $CH_3$ | $(CH_2)_2CH(CH_3)_2$ | $n-C_3H_7$ | $n-C_3H_7$ |
| $CH_3$ | $n-C_6H_{13}$ | $C_2H_5$ | $C_2H_5$ |
| $CH_3$ | $n-C_6H_{13}$ | $n-C_3H_7$ | $n-C_3H_7$ |
| $CH_3$ | $n-C_6H_{13}$ | $C_2H_5$ | $n-C_3H_7$ |
| $CH_3$ | $n-C_6H_{13}$ | $n-C_4H_9$ | $n-C_4H_9$ |

-continued

| X | R | R¹ | R² |
|---|---|---|---|
| $C_2H_5$ | $n\text{-}C_5H_{11}$ | $C_2H_5$ | $C_2H_5$ |
| $C_2H_5$ | $n\text{-}C_5H_{11}$ | $n\text{-}C_3H_7$ | $n\text{-}C_3H_7$ |
| $C_2H_5$ | $(CH_2)_2CH(CH_3)_2$ | $C_2H_5$ | $C_2H_5$ |
| $C_2H_5$ | $(CH_2)_2CH(CH_3)_2$ | $n\text{-}C_3H_7$ | $n\text{-}C_3H_7$ |
| $C_2H_5$ | $n\text{-}C_6H_{13}$ | $C_2H_5$ | $C_2H_5$ |
| $C_2H_5$ | $n\text{-}C_6H_{13}$ | $n\text{-}C_3H_7$ | $n\text{-}C_3H_7$ |
| $i\text{-}C_3H_7$ | $n\text{-}C_5H_{11}$ | $n\text{-}C_3H_7$ | $n\text{-}C_4H_9$ |
| $i\text{-}C_3H_7$ | $n\text{-}C_5H_{11}$ | $C_2H_5$ | $C_2H_5$ |
| $i\text{-}C_3H_7$ | $n\text{-}C_6H_{13}$ | $C_2H_5$ | $C_2H_5$ |
| $n\text{-}C_3H_7$ | $n\text{-}C_5H_{11}$ | $n\text{-}C_3H_7$ | $n\text{-}C_3H_7$ |

What is claimed is:

1. A process for dyeing a polyester or polyester-containing textile material at pH 8 to pH 11, which comprises applying one or more monoazo dyes of the formula I

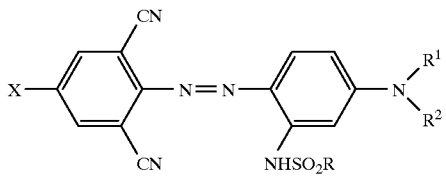

(I)

in which

X is $(C_1–C_3)$-alkyl,

R is $(C_2–C_6)$-alkyl, and R¹ and R², independently of one another, are linear $(C_2–C_4)$-alkyl, R¹ and R², independently of one another, being $(C_3–C_4)$-alkyl if R is methyl.

2. The process as claimed in claim 1, wherein X is methyl.

3. The process as claimed in claim 1, wherein R is $C_3–C_5$-alkyl.

4. The process as claimed in claim 1, wherein R¹ and R² are identical and are ethyl or n-propyl.

5. The process as claimed in claim 1, wherein the applying of the monoazo dye or monoazo dyes of formula I to the textile material is carried out in an aqueous dyeing liquor at a temperature in the range of 120° to 140° C.

6. The process as claimed in claim 5, wherein said applying step is carried out in a dyeing autoclave.

7. The process as claimed in claim 1, wherein said pH ranges from 9 to 10.

8. A process for dyeing a textile material, which consists essentially of:

applying to a textile material comprising polyester, under alkaline conditions, at least one monoazo dye of the formula I as the only dye(s)

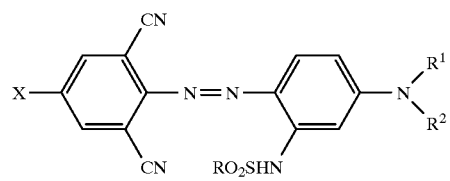

(I)

in which

X is $C_1–C_3$-alkyl,

R is $C_1–C_6$-alkyl and

R¹ and R², independently of one another, are linear $C_2–C_4$-alkyl, R¹ and R², independently of one another, being $C_3–C_4$-alkyl if R is methyl.

9. The process as claimed in claim 8, wherein said applying step is carried out at a pH of 8 to 11.

10. A process for dyeing a polyester or polyester-containing textile material at pH 8 to pH 11, which consists essentially of applying one or more monoazo dyes of the formula I as the only dye(s)

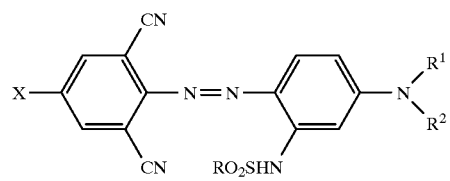

(I)

in which

X is $(C_1–C_3)$-alkyl,

R is $(C_1–C_6)$-alkyl, and

R¹ and R², independently of one another, are linear $(C_2–C_4)$-alkyl, R¹ and R², independently of one another, being $(C_3–C_4)$-alkyl if R is methyl.

11. A process for dyeing a polyester or polyester-containing textile material at pH 8 to pH 11, which consists essentially of applying more than one monoazo dye of the formula I as the only dye(s).

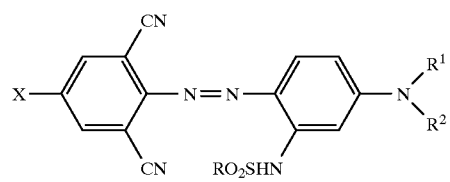

(I)

in which

X is $(C_1–C_3)$-alkyl,

R is $(C_1–C_6)$-alkyl, and

R¹ and R², independently of one another, are linear $(C_2–C_4)$-alkyl, R¹ and R², independently of one another, being $(C_3–C_4)$-alkyl if R is methyl.

* * * * *